US008375021B2

(12) United States Patent
Sokolan et al.

(10) Patent No.: US 8,375,021 B2
(45) Date of Patent: Feb. 12, 2013

(54) SEARCH ENGINE DATA STRUCTURE

(75) Inventors: Patrick Sokolan, Redmond, WA (US);
Dennis Doherty, Redmond, WA (US);
Claude Duguay, Kenmore, WA (US);
William Radcliffe, Redmond, WA (US);
Virgil Bourassa, Bellevue, WA (US);
Tammy King, Sammamish, WA (US);
John Sheppard, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 12/766,932

(22) Filed: Apr. 26, 2010

(65) Prior Publication Data

US 2011/0264646 A1     Oct. 27, 2011

(51) Int. Cl.
*G06F 17/30* (2006.01)
(52) U.S. Cl. ...................................................... 707/711
(58) Field of Classification Search ................. None
See application file for complete search history.

(56) References Cited

U.S. PATENT DOCUMENTS

| | | | |
|---|---|---|---|
| 5,950,189 A | | 9/1999 | Cohen et al. |
| 6,473,754 B1 * | | 10/2002 | Matsubayashi et al. ............ 1/1 |
| 7,440,947 B2 | | 10/2008 | Adcock et al. |
| 2005/0267871 A1 * | | 12/2005 | Marchisio et al. ............ 707/3 |
| 2006/0155751 A1 | | 7/2006 | Geshwind et al. |
| 2007/0006129 A1 | | 1/2007 | Cieslak et al. |
| 2007/0240035 A1 * | | 10/2007 | Sthanikam et al. ............ 715/513 |
| 2008/0016098 A1 * | | 1/2008 | Frieden et al. ............ 707/102 |
| 2008/0077570 A1 | | 3/2008 | Tang et al. |
| 2008/0109399 A1 * | | 5/2008 | Liao et al. ............ 707/2 |
| 2009/0012974 A1 * | | 1/2009 | Cassidy ............ 707/100 |

OTHER PUBLICATIONS

Goharian, et al., "Enterprise Text Processing: A Sparse Matrix Approach", Retrieved at <<http://ieeexplore.ieee.org/stamp/stamp.jsp?tp=&arnumber=918768>>, Proceedings International Conference on Information Technology: Coding and Computing, Apr. 2001, pp. 71-75.
Litwin, et al., "Fast nGram-Based String Search over Data Encoded Using Algebraic Signatures", Retrieved at <<http://www.csd.uoc.gr/~hy561/Data/Papers/p207-litwin.pdf >>, Very Large Data Bases, Proceedings of the 33rd international conference on Very large data bases, Sep. 23-27, 2007, pp. 207-218.

* cited by examiner

*Primary Examiner* — Bai D. Vu
(74) *Attorney, Agent, or Firm* — Rau Patents, LLC (57) ABSTRACT

A search engine database may a segmented structure that preserves individual document references and allows updating as well as scalability. A set of segment managers may receive new, updated, or deleted documents and update a set of term matrices from which a published search matrix may be generated. The database may have a very large term dictionary and may use a hash function to create term identifiers without having to look up terms in the dictionary. The database may be maintained by many systems operating in parallel for high scalability.

20 Claims, 5 Drawing Sheets

FIG. 5

SEARCH ENGINE DATA STRUCTURE

BACKGROUND

Many search engines use a database structure that enables fast lookup with minimum data storage. Such database structures may be created directly from content that may be crawled. When updates are performed to the database, the previous entries for a website or other set of documents may be removed and replaced with the new set of data for the updated documents.

SUMMARY

A search engine database may a segmented structure that preserves individual document references and allows updating as well as scalability. A set of segment managers may receive new, updated, or deleted documents and update a set of term matrices from which a published search matrix may be generated. The database may have a very large term dictionary and may use a hash function to create term identifiers without having to look up terms in the dictionary. The database may be maintained by many systems operating in parallel for high scalability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A search engine database may be created and maintained through set of document databases from which a search database may be created. The document databases may contain information from each document in the search database and may be updated from time to time to reflect the status of the document or any changes to the document. The search database may be created from the document databases.

The database system may be scalable by operating many processes in parallel. For example, the document databases may be broken into subsets of documents and processed by separate systems which may maintain the document databases and create subsets of the search database. A search engine may be scaled as a hierarchical set of search systems that may operate on subsets of the search database, then have their results merged.

The search engine database may enable very large term dictionaries and may eliminate term look up by performing a hash of the terms, and using the hash output as a term identifier. In such a manner, look up costs for each term can be avoided.

Throughout this specification and claims, the term "document" is used to denote the atomic unit that is stored and manipulated by the various systems. The "document" may be a word processing document, spreadsheet document, or other similar file. In some cases, the "document" may be a database record, web page, email message, or any other unit. The "document" may be text based or may include audio, video, or other types of data which may be classified, tagged, searched, or otherwise manipulated.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
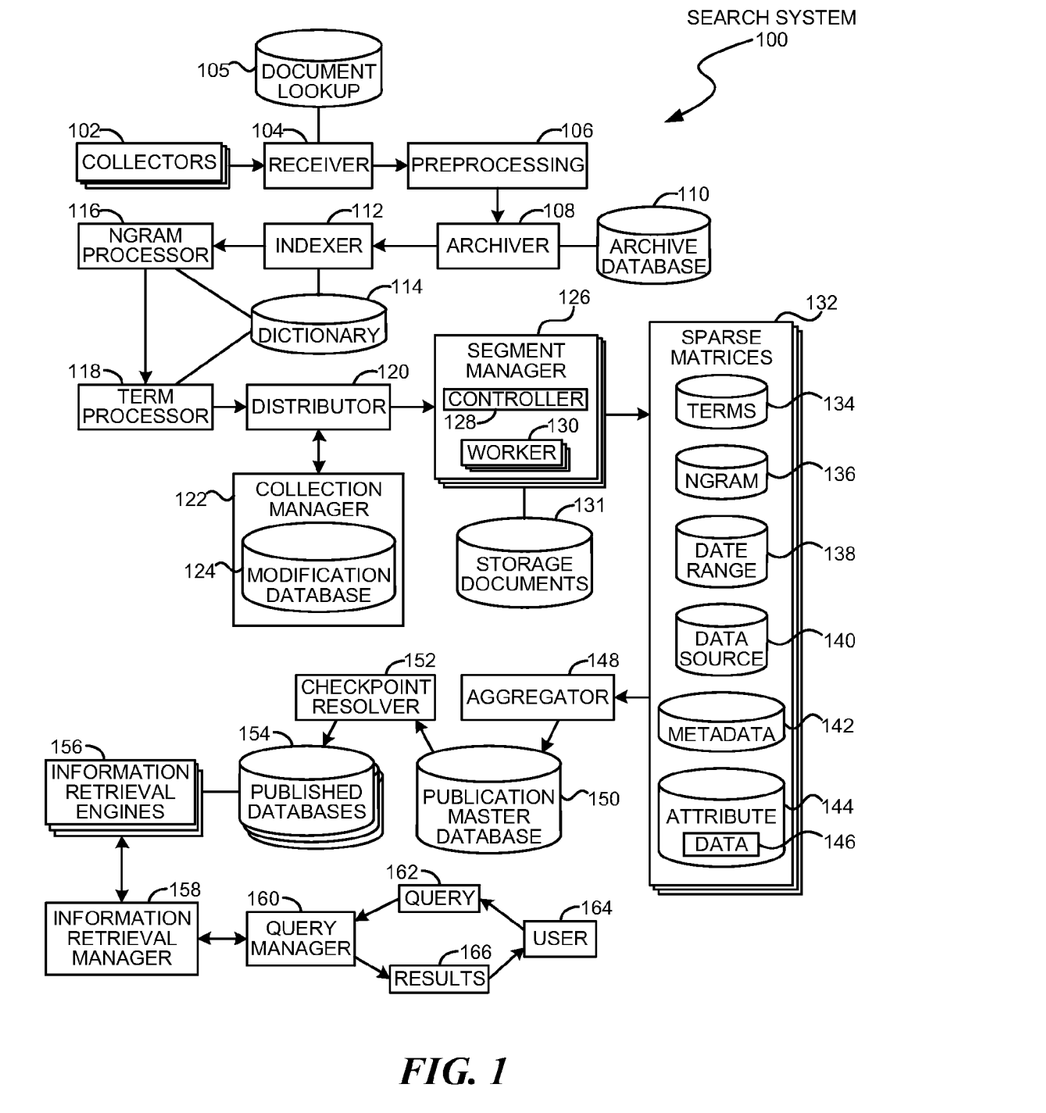
FIG. 1 is a diagram illustration of an embodiment showing a search system.

FIG. 1 is a diagram of an embodiment 100, showing components for a search system. Embodiment 100 is a simplified example of a search system that may be deployed on one or many hardware platforms.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a search system that may create a searchable database that may be easily modified and updated when the source documents may be added, modified, or deleted. Embodiment 100 is an example of a search system that may be used for an enterprise search, where documents from many different sources may be collected, organized, and made searchable. Such a system may be applicable to a company or organization that may have multiple data sources, such as web servers, databases, file systems, and other data sources.

Embodiment 100 may be deployed on a single hardware platform, while other embodiments may use many hardware platforms that may operate in concert to deliver a search system. Embodiment 100 may be scalable to provide search capabilities on the entire World Wide Web.

In some embodiments, the search system of embodiment 100 may be deployed as a desktop search engine that may provide search capabilities for files and information stored on a single device.

The search system of embodiment 100 may process documents and build a set of sparse matrices that can be used to search for content or properties of the document. In some embodiments, several different matrices may be created for searching specific types of data, such as metadata, tags, date ranges, text, or various attributes. The various matrices may enable very fast searching for common search requests in certain embodiments.

The search system of embodiment 100 may use a hash calculation to create identifiers for documents and terms within the documents. The hash calculation may be used to eliminate dictionary database lookups when converting a value into an identifier. The hash value and the term name may be stored in a dictionary for reverse lookups. The hash calculation may be MD5 or other similar hash that may have minimum or no collisions.

The search system of embodiment 100 may begin with a set of collectors 102 that may gather documents from various sources and feed those documents into a receiver 104.

The collectors 102 may connect to various data sources. In some cases, the collectors 102 may be web crawlers. In other cases, the collectors 102 may monitor file systems or other repositories. In some embodiments, the collectors 102 may process data records from various databases, where each data record may be considered a 'document'. Examples of such data records may be web pages that are created on-the-fly, email messages provided from an email system, financial reports generated from a financial database system, or other data records.

In some embodiments, the documents processed by the system of embodiment 100 may be documents without formatting. For example, a word processing document may be stripped of any formatting and indexed using only the content of the file.

The receiver 104 may receive the output from the collectors 102 and transmit the received documents to a preprocessor 106. In many cases, the receiver 104 may create a document identifier by assigning a sequential number to each new document. The document identifier may be stored in a document lookup database 105 along with a hash of a Uniform Resource Identifier (URI) that identifies where the document may be found.

When a document is received, the hash of the URI may be performed and determined if the document has already been processed by looking up the hash in the document lookup database 105. If the hash is found, the associated document identifier may be used. If the hash is not found, a new document identifier may be determined by using the next sequential number as the new document identifier. The hashed URI may be stored with the document and used as a metadata term for the document in some cases. In other embodiments, duplicate documents may be processed and the duplicates may be identified at a later step.

The preprocessor 106 may analyze the documents and perform any type of processing to prepare the documents for the indexing and search process. In some embodiments, the preprocessor 106 may be to scan a document for text using optical character recognition, for example.

In some embodiments, the preprocessor 106 may analyze the document contents in order to create tags or to highlight key terms or type of data. For example, dates in a document may be tagged and used in a date range matrix for searching for references to specific dates or date ranges.

An archiver 108 may create a copy of the document in an archive database 110. In some embodiments, an archive copy may be presented to a user instead of the original version of the document. Such an archive copy may be stored in the archive database 110.

An indexer 112 may process the document to identify words and phrases. The indexer 112 may use a dictionary 114 that may contain, among other things, words and phrases in a language, such as English. The indexer 112 may look up the words in the dictionary 114 to determine an index or identifier for the word. The word may be replaced with the index in a document. In some embodiments, an indexer may parse the text from a document and create a list of term strings, frequencies, and other metadata about the document.

In many embodiments, the dictionary 114 may include both individual words and phrases. The phrases may be two, three, or more word sequences. The phrases may be treated as single words by having a single index for the entire phrase.

The index or identifier determined by the indexer 112 may be considered a 'term' for the search engine. A term may be an item for which a search may be performed.

An ngram processor 116 may replace the text of a document with character ngrams. In a typical embodiment, three character trigrams may be used. Other embodiments may use unigrams, bigrams, trigrams, or other ngrams.

The term processor 118 may examine a document to identify any special terms, such as tags, metadata, database indices, attributes, or other items. The term processor 118 may create term identifiers by performing a hash on a term and using the resulting value as the term identifier.

After processing by the term processor 118, a document may consist of identifiers and may not contain text or other data types. Such a document may be known as a storage document.

A distributor 120 may send the document to an appropriate segment manager 126. In many embodiments, multiple segment managers 126 may be used to update a set of sparse matrices 132. Each segment manager 126 may be assigned to a range of documents and may handle adding new documents, updating documents, and deleting documents from the search system.

In one embodiment, each segment manager 126 may be assigned a range of document identifiers. For example, the first segment manager 126 may be assigned document identifiers 0 through 499,999, and the second segment manager 126 may be assigned document identifiers 500,000 through 999,999 and so on. Such embodiments may organize all of the various matrices by document identifier number, which may facilitate merging the various matrices together.

The search system of embodiment 100 may be scaled to very large sets of documents. When implemented on an Internet scale, the flow of the various components described in embodiment 100 may be implemented in several parallel pipelines, with a queuing system between each component. A pipeline may be defined by a linked set of components, such as the receiver 104, preprocessing 106, archiver 108, and other components. In a pipeline design, a set of linked components may be joined in series and may operate as a single set of components that operate in parallel with one or more other pipelines.

In a typical pipeline configuration, a buffer or queue system may be implemented between each component. For example, a buffer may receive the output from the receiver 104 and queue documents to be processed by the preprocessor 106. A second buffer may be implemented between the preprocessor 106 and the archiver 108, and so on.

The pipelines may operate in parallel for the receiver 104, preprocessing 106, and other components until the distributor 120. Some embodiments may have two, three, or even thousands of parallel pipelines depending on the size of the document set.

In a parallel pipeline implementation, each component may be executed on a set of independent processes, which may or may not be implemented on independent hardware platforms. A parallel pipeline implementation may allow large documents that may consume larger amounts of processing at each component to flow through the pipeline without holding up smaller documents that may flow through other, parallel pipelines.

In another configuration, each component in the flow from the receiver 104 through the distributor 120 may have one or more processes that may operate in parallel. Between each component, a buffer or queuing system may buffer output from the previous component and make the output available to the next component in the sequence. Such an embodiment may have a single pipeline but may have parallel processes at each component. In many such embodiments, each component may operate on two or more hardware platforms for redundancy and performance.

In some embodiments, a parallel pipeline architecture may implement two or more processes or hardware platforms at each component and be a combination of a parallel pipeline embodiment with parallel components.

The segment manager 126 may have a controller 128 and a worker 130. Examples of the operations of the controller 128 and worker 130 may be found in embodiments 300 and 400 presented later in this specification. The controller 128 may identify updated or changed documents in a modification database 124 managed by a collection manager 122. The controller 128 may generate a list of documents that may be processed by a worker 130. The worker 130 may analyze a storage document to create various sparse matrices 132, which may be aggregated into a larger sparse matrix from several other documents.

The collection manager 122 may monitor the documents being received by the distributor 120 and store information regarding the documents in a modification database 124. The modification database 124 may include a list of all the documents with the document identifier and a timestamp the document was received. A controller 128 may scan the list of documents to identify changed documents based on the timestamp.

Each segment manager 126 may store the storage documents 131 for the range of documents for which the segment manager is responsible. The storage documents 131 may represent the original document, but may include term identifiers and ngrams as opposed to tags, text, and other items. In some embodiments, the segment manager 126 may update the storage documents 131 and create updated versions of the various sparse matrices 132.

The sparse matrices 132 may be used to search for specific items in the set of documents. Each sparse matrix may have a set of parameters or values for which a search may be performed, and many embodiments may have two, three, or more sparse matrices that may be focused on certain types of data.

For example, an embodiment may have a sparse matrix for terms 134. The terms 134 may include tags and whole words that may have been identified by the indexer 112 or the term processor 118.

Some embodiments may have a sparse matrix for ngrams 136. The ngram 136 matrix may allow searches that permit misspellings or other fuzzy searches, such as phrase searches for example.

Date ranges 138 may be a sparse matrix that includes dates, which may include years, months, days, time of day, or other indicators that may have been identified within a document or the metadata associated with a document. The date ranges 138 may be determined by a preprocessor 106 that scans a document for references to date or time, as well as scanning the document metadata for date stamps for document creation, modification, retrieval, or other metadata. Examples of dates may include a document creation date, document modification date, and database fields that include dates.

A data source 140 sparse matrix may store information about the source of a document. Such a sparse matrix may be useful in an enterprise search use scenario where documents from email systems, file systems, databases, and other sources may be collected and organized. The data source 140 sparse matrix may enable efficient searching by using data source identifiers in a search request to include or exclude documents from specific data sources.

A metadata 142 sparse matrix may store various metadata that may be searchable. The metadata may include any information relating to the document, which may be document type, author, application used to create the document, or any other information about the document.

An attribute 144 sparse matrix may include data 146 that may represent records retrieved from a database or parameters that have been tagged and for which data may be associated.

The various sparse matrices 132 are examples of different sparse matrices that may be created in different embodiments. Some embodiments may have a subset of sparse matrices 132, while other embodiments may have a superset. The sparse matrices 132 may be tailored to each embodiment to address specific types of searches that may be anticipated.

An aggregator 148 may gather the various sparse matrices 132 and create a publication master database 150. In many embodiments, the sparse matrices 132 may assembled or merged in a hierarchical fashion. For example, a segment manager 126 may create a sparse matrix for documents 0 through 499,999 and a second segment manager may create a sparse matrix for documents 500,000 through 999,999. An aggregator 148 may combine or merge both smaller sparse matrices into a single sparse matrix that includes documents 0 through 999,999. In some embodiments, several such combinations may be performed in a hierarchical fashion to create the publication master database 150.

Figure 5:
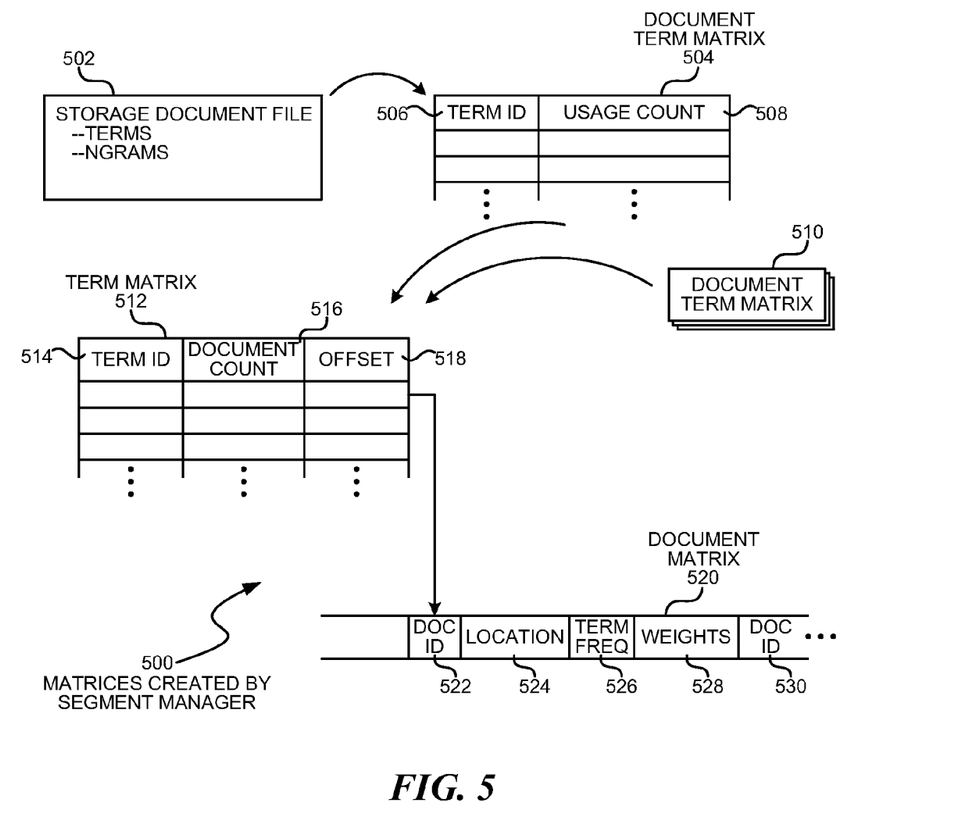
FIG. 5 is a diagram illustration of a set of example matrices that may be created by a segment manager.

A simplified example of the various matrices and how those matrices may be combined is presented in embodiment 500 later in this specification.

A checkpoint resolver 152 may perform some final processing of the publication master database 150 and create published databases 154. The checkpoint resolver 152 may determine aggregated usage frequency or weights for various terms, as well as other operations that may prepare the publication master database 150 for use. In many embodiments where multiple sparse matrices are used, the checkpoint resolver 152 may publish each type of sparse matrix separately.

The published databases 154 may be reference by a set of information retrieval engines 156. In a larger search system, several information retrieval engines 156 may be used in parallel and may be managed by an information retrieval manager 158. In a parallel embodiment, each information retrieval engine 156 may operate on a subset of the entire published database and the results from the individual information retrieval engines 156 may be aggregated and sorted by the information retrieval manager 158.

A query manager 160 may receive a query 162 from a user 164, process the query 162, and transmit the query to the information retrieval manager 158. The information retrieval manager 158 may send the query to the various information retrieval engines 156, receive the responses, and aggregate and sort the responses. The responses may be returned to the query manager 160, which may transmit results 166 to the user 164.

The query manager 160 may process the query 162 by identifying terms or other information in the query 162 by replacing terms with term identifiers, for example. Because the term identifiers are a hash of the term, the query manager 160 may perform the hash to determine the term identifiers. In some embodiments, a lookup table or dictionary may be queried to determine a term identifier.

Figure 2:
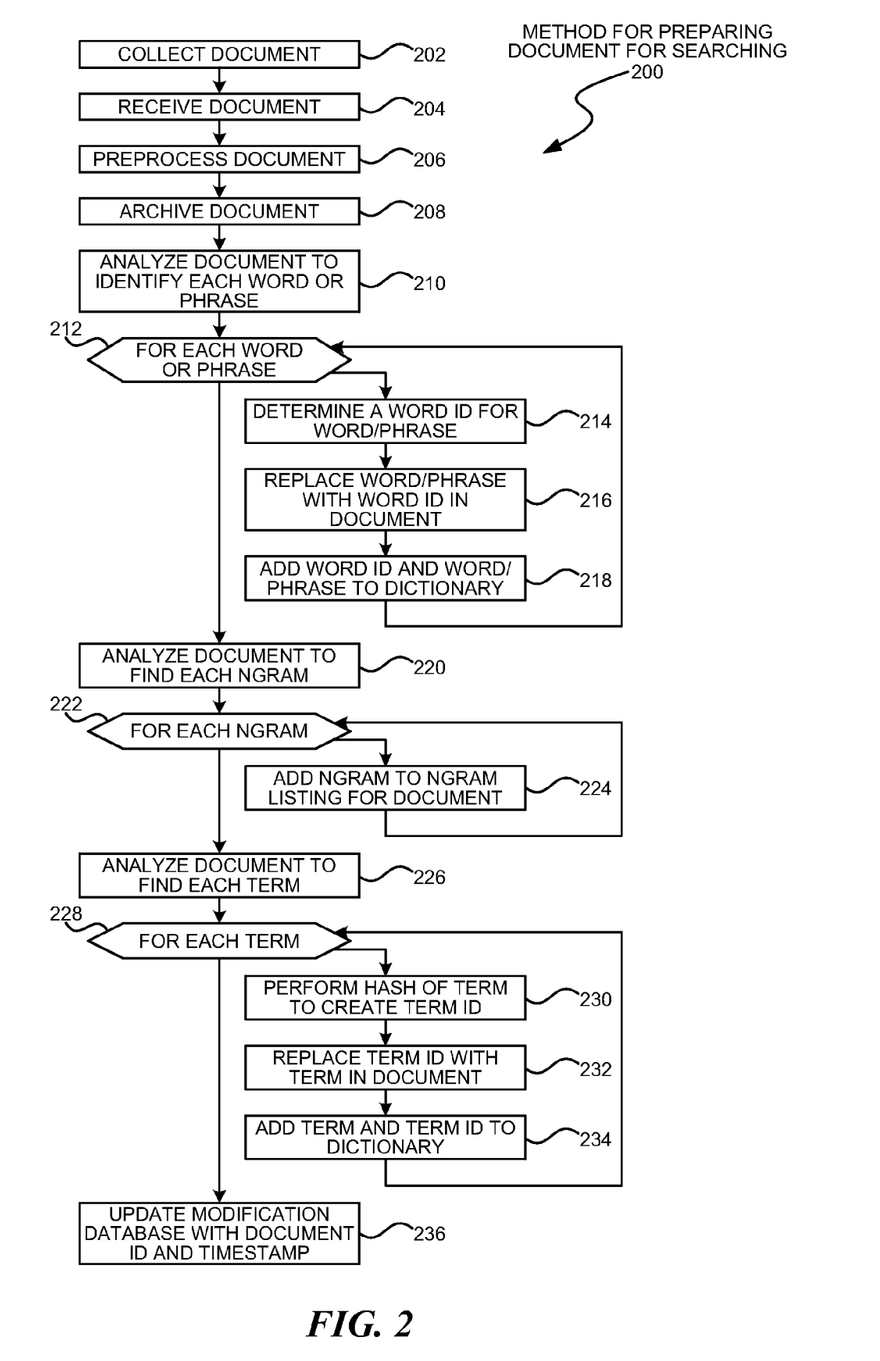
FIG. 2 is a flowchart illustration of an embodiment showing a method for preparing a document for searching.

FIG. 2 is a flowchart illustration of an embodiment 200 showing a method for preparing a document for searching. Embodiment 200 is a simplified example of the processes that may be performed by some of the components as described in embodiment 100. Specifically, embodiment 200 may represent one method that may be performed by the collectors 102, receiver 104, preprocessor 106, archiver 108, indexer 112, ngram processor 114, term processor 118, and distributor 120 as illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a highly simplified example of a process for preparing a document for searching. Embodiment 200 receives a document and processes the document to a state where the document may be efficiently processed by a segment manager to create sparse matrices that may be searched. Embodiments 300 and 400 presented later in this specification illustrate a process by which the sparse matrices may be processed and embodiment 500 illustrates a simplified example of those matrices.

Embodiment 200 prepares a document by creating a storage document that includes term identifiers and ngrams that represents the original document, but where the storage document may be more efficiently handled through subsequent processes. Other embodiments may preserve text strings or other parameters in a storage document and may include such information in the sparse matrices.

The storage document may be constructed by identifying and replacing text, tags, and other elements with term identifiers, ngrams, and other elements. In some embodiments, a copy of the original document may be stored for retrieval in a cached mode or when the original document may not be easily or immediately accessible. The storage document may be stored by a segment manager and used to compare any changes to an updated document or used to rebuild a portion of a sparse matrix.

A document may be collected in block 202 and received in block 204. In many cases, a document may be collected by a process or operation that is performed at a physical location away from portions of the search system. For example, a set of web crawlers may traverse a website from a server or datacenter and send documents to the search system. In another example, a monitoring process may operate on the same server or system as a database and may identify and transmit document changes to the search system.

When a document is received in block 204, a document identifier may be assigned to the document and used throughout the process. In some embodiments, a Uniform Resource Identifier may be available for each document and may be used as a signature to identify specific documents. The signature and document identifier may be stored in a database for document lookup and used to identify a received document that may be updated or changed.

In some embodiments, the received document may be identified as a changed or modified document when the document is received. Some embodiments may process changed or modified documents in a separate manner. For example, a modified document may be processed at a lower or higher priority to newly added documents. In some embodiments, a modified document may be processed by identifying the changes and only processed the incremental changes to the document. In other embodiments, a changed document may be re-processed using the same processes as a newly added document.

The document may be preprocessed in block 206. The preprocessing step may identify items in a document that may be used as terms, attributes, tags, or other parameters for which the document may be searched. In some embodiments, a document may be received in a tagged form, with various tags identifying the parameters that may be converted to and searchable by terms.

In block 210, each word or phrase may be identified in the document. In some embodiments, a phrase may be treated as a 'word' for the purposes of searching and ranking results. Each word or phrase may be processed in block 212. For each word or phrase in block 212, a word identifier may be determined in block 214 and be used to replace the original word or phrase in block 216 in the original document. The word identifier and word or phrase may be added to a dictionary in block 218.

The word identifier may be determined in several different manners. In some embodiments, a predefined dictionary may contain a set of words and phrases with index numbers or identifiers. In such an embodiment, the word identifier may be determined by searching the dictionary to identify the identifier. If the word or phrase is not found, the word may be added to the dictionary.

In other embodiment, the word identifier may be created by performing a hash on the word and using the hash value as the word identifier.

In some embodiments, the words identified in block 210 and processed in block 212 may be a subset of all the words in a document. Such embodiments may remove very common words, such as "a", "the", "is", and select words based on common usage frequency, entropy, or other measure.

In block 220, the document may be searched to identify each ngram. An ngram may be a character ngram, such as a bigram or trigram. Some embodiments may use other types of ngrams. Each ngram may be processed in block 222, and for each ngram in block 222, the ngram may be added to the ngram listing in a storage document in block 224.

In block 226, each term in the document may be identified. A term may be a field, tag, metadata, or other identifier that may be searchable in the search system. Each term may be analyzed in block 228. For each term in block 228, a hash of the term may be performed in block 230 and the hash value may be used as the term identifier. The term may be replaced by the term identifier in block 232 and the term identifier and term may be added to a dictionary in block 234.

After processing each term, the document may have been transformed to a storage document that contains term identifiers and ngrams. In some embodiments, the storage document may not include text strings or other information.

Figure 3:
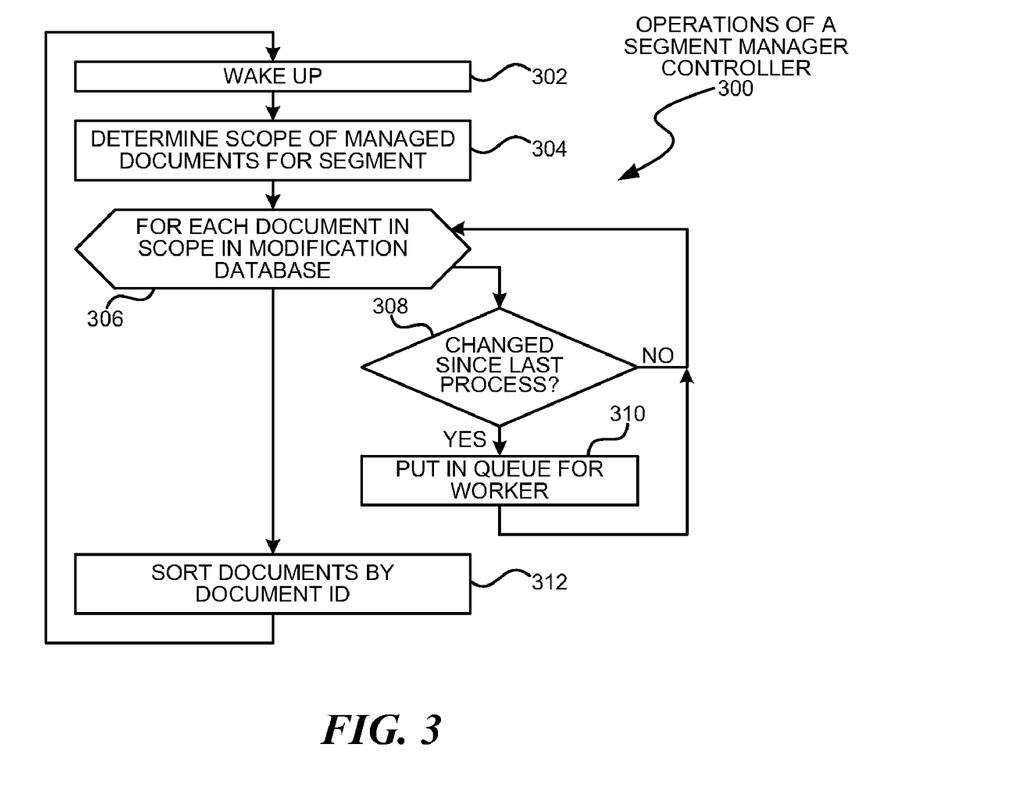
FIG. 3 is a flowchart illustration of an embodiment showing a method that may be performed by a segment manager controller.

An entry may be added or updated to a modification database with the document identifier and a timestamp in block 238. A segment manager control thread may process the document from the modification database. An example of such a process may be found in embodiment 300.

FIG. 3 is a flowchart illustration of an embodiment 300 showing a method that may be performed by a segment manager controller. Embodiment 300 is a simplified example of the processes that may be performed by a controller thread of a segment manager, such as the controller 128 of the segment manger 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 4:
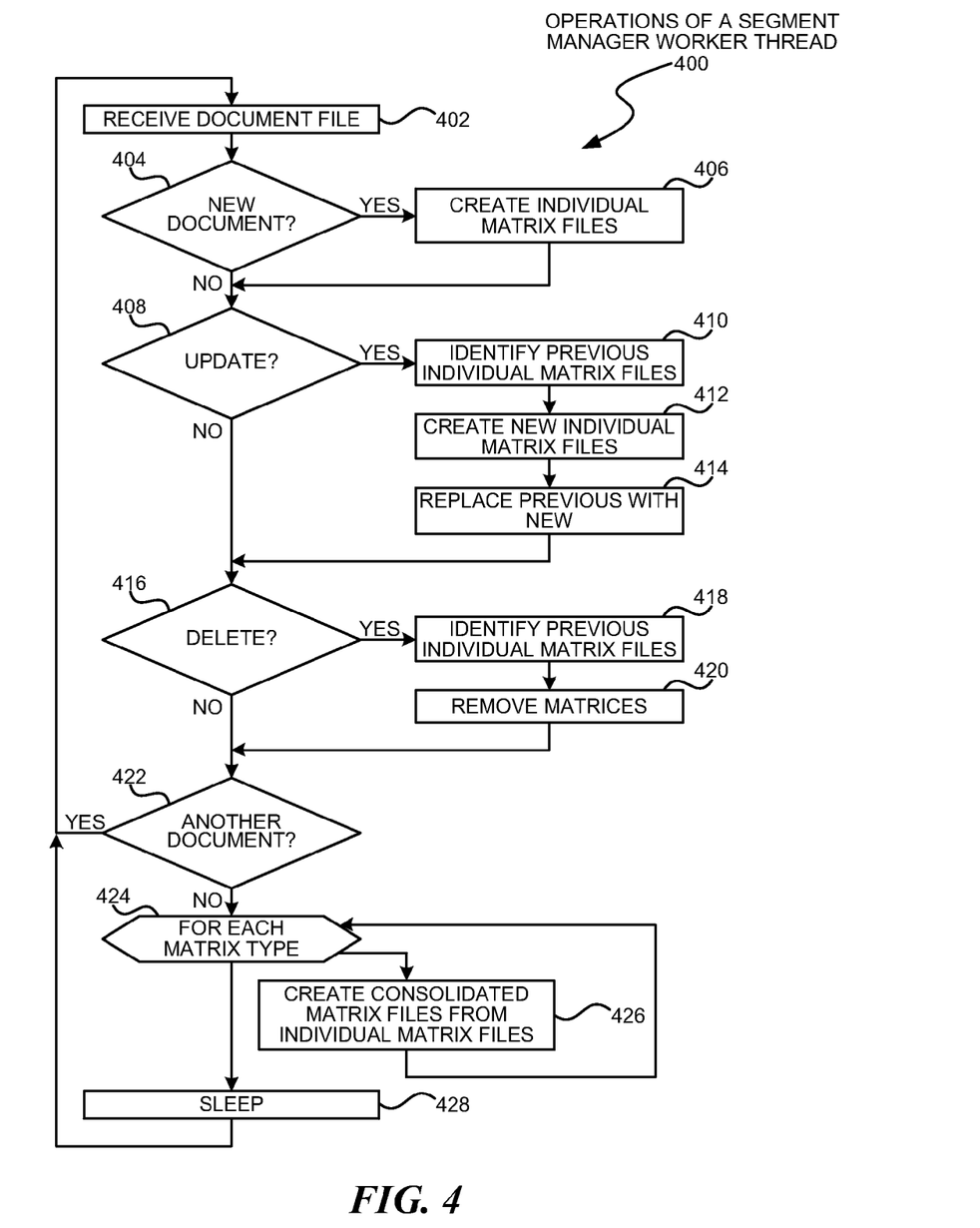
FIG. 4 is a flowchart illustration of an embodiment showing a method that may be performed by a segment manager worker.

The controller of a segment manager may identify any new, modified, or deleted documents in a modification database. The identified documents may be placed in a queue to be processed by workers, an example of which may be found in embodiment 400 presented later in this specification.

The controller may wake up in block 302. In many embodiments, a controller may operate on a predefined schedule to identify documents to process by a worker. In some embodiments, the controller may be launched when a predefined condition exists, such as when a worker thread becomes idle or when a modification database has received a predefined number of changed documents or a predefined percentage of changed documents, for example.

The scope of the managed documents may be determined in block 304 for the segment to be analyzed. In many embodiments, several controllers may be used in parallel and each of the controllers may manage a portion of the documents. The range of documents managed by a controller may be defined by document identifier, such as a range of document identifiers from 0 to 99,999 or some other range.

In block 306, each document in the range of documents may be analyzed from a modification database. For each document in block 306, if the document has not changed since the last run of the controller in block 308, the process may return to block 306 to process another document. If the document has changed in block 308, the document may be added to a queue for a worker in block 310.

After processing each document in the range of documents in block 306, the document may be sorted by document identifier in block 312 and the process may return to block 302.

FIG. 4 is a flowchart illustration of an embodiment 400 showing a method for processing a document by a worker. Embodiment 400 is a simplified example of the processes that may be performed by a worker thread of a segment manager, such as the worker 130 of the segment manger 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a method by which each storage document may be broken down into multiple matrix files, then those matrix filed may be merged into a consolidated matrix file. The consolidated matrix file may be used by an information retrieval engine to perform a search for a term, ngram, metadata, or other item that may be indexed in a matrix file.

An example of the matrix files may be illustrated in embodiment 500 presented later in this specification.

A document file may be received in block 402. In some embodiments, the document file may be a storage document that may contain term identifiers, ngrams, and other items that may have been culled from an original document.

Embodiment 400 illustrates a method for processing each document file differently, based on whether or not the document file is a new file, updated file, or deleted file. In some embodiments, a document file may be labeled as "new", "modified", or "deleted" by an upstream process, such as the receiver 104 of embodiment 100. Such an identifier may be used by the worker of embodiment 400 to determine a classification of a document.

In other embodiments, the worker may compare the document received in block 402 with a stored copy of a previous storage document to determine if the received document is "new", "modified", or "deleted".

If the received document is new in block 404, individual matrix files may be created in block 406. An individual matrix file may include each searchable parameter with the frequencies of use and other information for that document. In many embodiments, several different types of matrices may be maintained.

For example, a term matrix may be created that contains each term, such as a word or phrase. An ngram matrix may be crated that contains ngrams and may be used for fuzzy searches for misspelled words or for searching word fragments. A date range matrix may be created for storing any date or time related information in the document or related to the document. A data source matrix may be used in some embodiments to track the sources of document and allow efficient searching based on a document origin, a type of document, or other information relating to a source of the document. A metadata matrix may be created for storing various metadata parameters, which may vary depending on the embodiment. An attribute matrix may be capture each tagged item and its associated data for embodiments where documents may be tagged in the document text or in metadata. Other embodiments may have additional matrix types.

The individual matrix files of block 406 may merely pull out the information that may be stored in each matrix and may consist of a single row in a sparse matrix of the various types.

If the document is an updated document in block 408, the previous individual matrix files may be identified in block 410 and new individual matrix files may be created in block 412. The old matrix files may be replaced with the new matrix files in block 414.

If the document is deleted in block 416, the previous individual matrix files may be identified in block 418 and removed in block 420.

If another document is available for processing in block 422, the process may return to block 402. When all new, modified, or deleted documents are processed in block 422, each matrix type may be processed in block 424.

For each matrix type in block 424, a consolidated matrix file may be created from the individual matrix files. The consolidated matrix file may merely be the merge of all individual matrix files, each of which may represent a single row of the consolidated matrix.

In many embodiments, the matrix files may be arranged in a hierarchical fashion and managed by several different computers or processes. In a hierarchical arrangement, several smaller matrices may be created, merged together to form larger matrices. The larger matrices may be further merged together to form even larger matrices, and so forth. In embodiments with very large sets of data, such a hierarchical arrangement may allow the search system to scale to very large sizes.

After each matrix type may be processed in block 424, the worker thread may enter a sleep mode in block 428 until awakened to process another list of documents.

FIG. 5 is a diagram illustration showing an example embodiment 500 showing various matrices that may be created by a segment manger. The example of embodiment 500 is a simplified example of a set of matrices that may be created from a storage document file.

A storage document file 502 may contain information about terms, ngrams, as well as other information that may be used to create sparse matrices for searching. Embodiment 500 illustrates the creation of a single type of sparse matrix, in this case a term matrix.

From the storage document file 502, a document term matrix 504 may be created. The document term matrix 504 may be an individual matrix file that represent just the terms found in the current document. The document term matrix 504 may include a term identifier 506 and usage count 508. The usage count 508 may represent term frequencies that may be used to calculate document scores during a search.

A term matrix 512 may be created by analyzing several document term matrices 510 and 504 to create a sparse matrix that contains each term identifier and the documents in which the term is found.

The sparse matrix may be created with each row having a separate term identifier and each column having a separate document identifier. Each element in the matrix may include a usage count and other data, such as location data.

From the sparse matrix, a term matrix 512 and document matrix 520 may be created. The term matrix 512 and document matrix 520 may be a compressed form of the sparse matrix and may be organized so that an information retrieval engine may quickly find the documents associated with various terms, as well as other information for the documents that may allow a document score to be calculated.

The term matrix 512 may include a term identifier 514, a document count 516, and an offset 518. The term identifier 514 may be a hash result of a term, as described previously. The document count 516 may be the number of documents in which the term may appear, and the offset 518 may be a pointer into the document matrix 520 from which an information engine may begin reading.

An information engine may search the term matrix 512 to identify a term, and then begin reading the document matrix 520 beginning at the offset 518 and continue to read each document for the number of documents in the document count 516.

The document matrix 520 may include the information derived from the storage document for the particular terms. Other types of document matrices may be created for date ranges, ngrams, and other types of searchable items. The document matrix 520 may include a document identifier 522 and then several parameters that may allow a information retrieval engine to determine the document's value or score with respect to other documents.

For example, the document matrix 520 may include a location 524 for the term. The location 524 may be the usage of the term within the document. For example, the location 524 may indicate if the term was used in the body text of the document, a section title or the document title, whether the term was formatted specially, such as bold or italics, or other uses of the term. When the location 524 indicates that the term was used in a non-normal manner, such as a title or when bolded, such a usage may indicate a higher importance of the word in the document.

The document matrix 520 may include a term frequency 526 that may be an integer count representing the number of times the term may be used in the document. The term frequency 526 may correspond with the usage count 508 in the document term matrix 504.

The document matrix 520 may include one or more weights 528 which may represent the relative importance of the word in the corpus of documents. The weights 528 may be the TF-IDF or term frequency-inverse document frequency that expresses importance of a term with respect to the entire corpus of documents. A simple manner for calculating the inverse document frequency may be to divide the documents that contain the term by the total number of documents. Some embodiments may invert such a ratio and take a logarithm of the ratio.

The weights 528 may be calculated based on analysis of the entire corpus of documents. In many embodiments, the document matrix 520 may be created without the weights 528 but with a space within the document matrix 520 allocated for the weights 528. The weights 528 may be calculated when all of the term matrices 512 have been aggregated and are ready for publication. At such a time, a checkpoint resolver, such as checkpoint resolver 152 or other analysis tool, may analyze the corpus of documents to create the weights 528 and populate the values within the document matrix 520.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one computer processor, said method comprising:
    receiving a first document comprising tags and words;
    creating a storage document comprising term identifiers by a first method comprising:
        for each of said tags, determining a term for a tag, and determining a term identification by performing a hash on said term, replacing said tag with said term identifier in said storage document;
        for each of said words, determining a term identifier for said word and replacing said word with said term identifier in said storage document;
        storing said storage document;
    creating a plurality of search matrices from said storage document, at least one of said plurality of search matrices being an individual term search matrix;
    gathering a plurality of said individual term search matrices together into a consolidated term search matrix, each of said plurality of said individual term search matrices having been created from a different document;
    receiving a search request comprising a first tag;
    performing a hash on said first tag to create a first tag identifier;
    searching for said first tag identifier as a term in said consolidated term search matrix to identify said first document; and
    presenting said first document as a search result.

2. The method of claim 1 further comprising:
    identifying a plurality of ngrams in said first document; and
    storing said ngrams in said storage document.

3. The method of claim 2 further comprising:
    creating an individual ngram search matrix from said storage document;
    gathering a plurality of said individual ngram search matrices together into a consolidated ngram search matrix, each of said plurality of said individual ngram search matrices having been created from a different document; and
    searching said consolidated ngram search matrix with at least a portion of said search request.

4. The method of claim 2, said ngrams being a three letter trigrams.

5. The method of claim 1, said hash being an MD5 hash.

6. The method of claim 1, said words comprising words and phrases.

7. The method of claim 1, said term identifier for said word being determined by looking up said word in a word dictionary.

8. A system comprising:
    an indexer that identifies words within a first document and determines a term identifier for said words, said first document having a document identifier;
    a term processor that identifies terms within said first document and determines a term identifier for said terms;
    a distributor that identifies a first segment manager from a plurality of segment managers based on said document identifier and transmits at least said document identifier to said first segment manager;
    said first segment manager that creates a plurality of individual matrices from said first document;
    an aggregator that creates a set of consolidated matrices from a plurality of individual matrices; and
    a search engine that receives a search query, searches said set of consolidated matrices to identify a search result, and returns said search result.

9. The system of claim 8, said search engine comprising:
    a plurality of information retrieval engines, each of said information retrieval engines being configured to search a portion of said consolidated matrices; and
    an aggregator that receives results from each of said information retrieval engines to determine said search result.

10. The system of claim 9, each of said information retrieval engines being independent processes.

11. The system of claim 10, at least one of said independent processes operating on a first hardware platform and a second of said independent processes operating on a second hardware platform.

12. The system of claim 11, said first segment manager operating on a third hardware platform and a second segment manager operating on a fourth hardware platform.

13. The system of claim 8, said set of consolidated matrices comprising a set of ngram matrices and a set of term matrices.

14. The system of claim 13, said set of consolidated matrices comprising a set of date matrices.

15. The system of claim 14, said set of consolidated matrices comprising a set of attribute matrices, said attributes being derived from tags in said first document.

16. The system of claim 8, said document identifier being a hash of a Uniform Resource Identifier for said document.

17. The system of claim 8, each of said indexer, said first segment manager, and said search engine operating on a separate hardware platform.

18. A system comprising:
    an indexer that identifies words within a first document and determines a term identifier for said words, said first document having a document identifier;
    a term processor that identifies terms within said first document and determines a term identifier for said terms, at least a portion of said terms being derived from tags in said first document;
    a plurality of segment managers, each of said segment managers that manage as set of documents and create a plurality of search matrices from said set of documents;
    a distributor that identifies a first segment manager from said plurality of segment managers based on said document identifier and transmits at least said document identifier to said first segment manager;
    an aggregator that creates a set of consolidated matrices from a plurality of said search matrices; and a search engine that receives a search query, searches said set of consolidated matrices to identify a search result, and returns said search result.

19. The system of claim 18, said segment managers that further receive a modification for a document and updates said set of search matrices with said modification.

20. The system of claim 19, said segment managers that further receive a delete notification for a document and removes said document from said set of search matrices.

\* \* \* \* \*